United States Patent [19]

Dettling et al.

[11] Patent Number: 5,100,632
[45] Date of Patent: Mar. 31, 1992

[54] CATALYZED DIESEL EXHAUST PARTICULATE FILTER

[75] Inventors: Joseph C. Dettling, Howell; Robert Skomoroski, Paterson, both of N.J.

[73] Assignee: Engelhard Corporation, Iselin, N.J.

[21] Appl. No.: 487,555

[22] Filed: Mar. 2, 1990
(Under 37 CFR 1.47)

Related U.S. Application Data

[63] Continuation-in-part of Ser. No. 415,431, Sep. 27, 1989, abandoned, which is a continuation of Ser. No. 250,459, Sep. 28, 1988, abandoned, which is a continuation of Ser. No. 122,625, Nov. 19, 1987, abandoned, which is a continuation of Ser. No. 602,783, Apr. 23, 1984, abandoned.

[51] Int. Cl.$^5$ .............................................. B01J 8/02
[52] U.S. Cl. ..................................... 423/213.5; 55/96; 55/523; 60/301; 60/311; 502/328
[58] Field of Search ................... 55/523, 96; 502/328; 423/213.5; 60/299-301; 422/311

[56] References Cited

U.S. PATENT DOCUMENTS

| | | | |
|---|---|---|---|
| 4,183,829 | 1/1980 | Adachi et al. | 423/213.5 |
| 4,426,320 | 1/1984 | Ernest et al. | 423/213.5 |
| 4,965,243 | 10/1990 | Yamada et al. | 423/213.5 |

FOREIGN PATENT DOCUMENTS 149221 7/1986 Japan ................................. 55/523

Primary Examiner—Bernard Nozick

[57] ABSTRACT

A self-cleaning diesel exhaust particulate filter is disclosed wherein burn-off of collected particulate matter is accomplished at certain exhaust gas temperatures, the filter being provided with a catalyst mixture consisting essentially of a platinum group metal and an alkaline earth metal oxide. The platinum group metal may be one or both of platinum and rhodium and the alkaline earth metal oxide may be magnesium oxide. The presence of the catalyst mixture serves to lower the temperature at which ignition of the collected particulates is initiated.

21 Claims, 4 Drawing Sheets

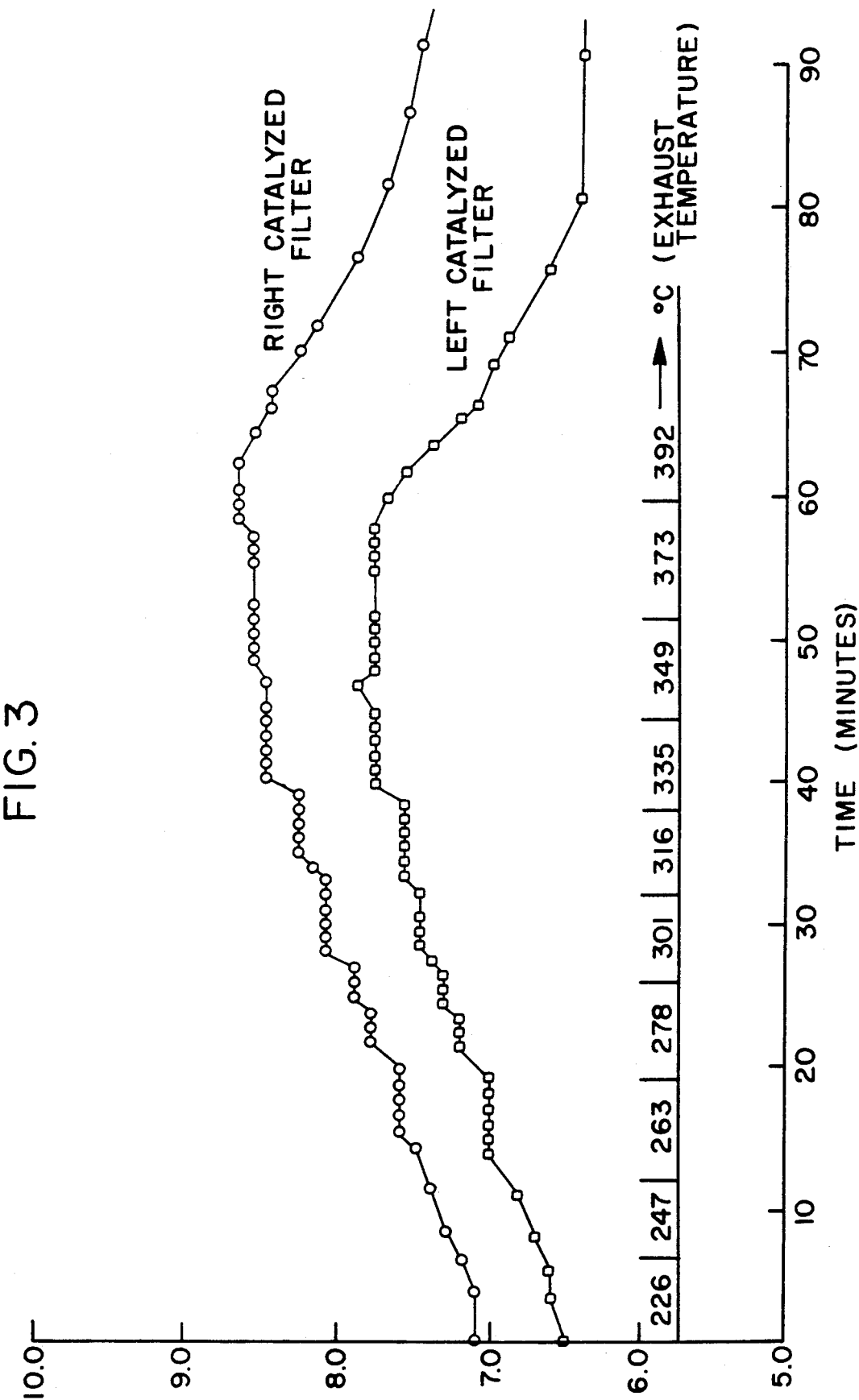

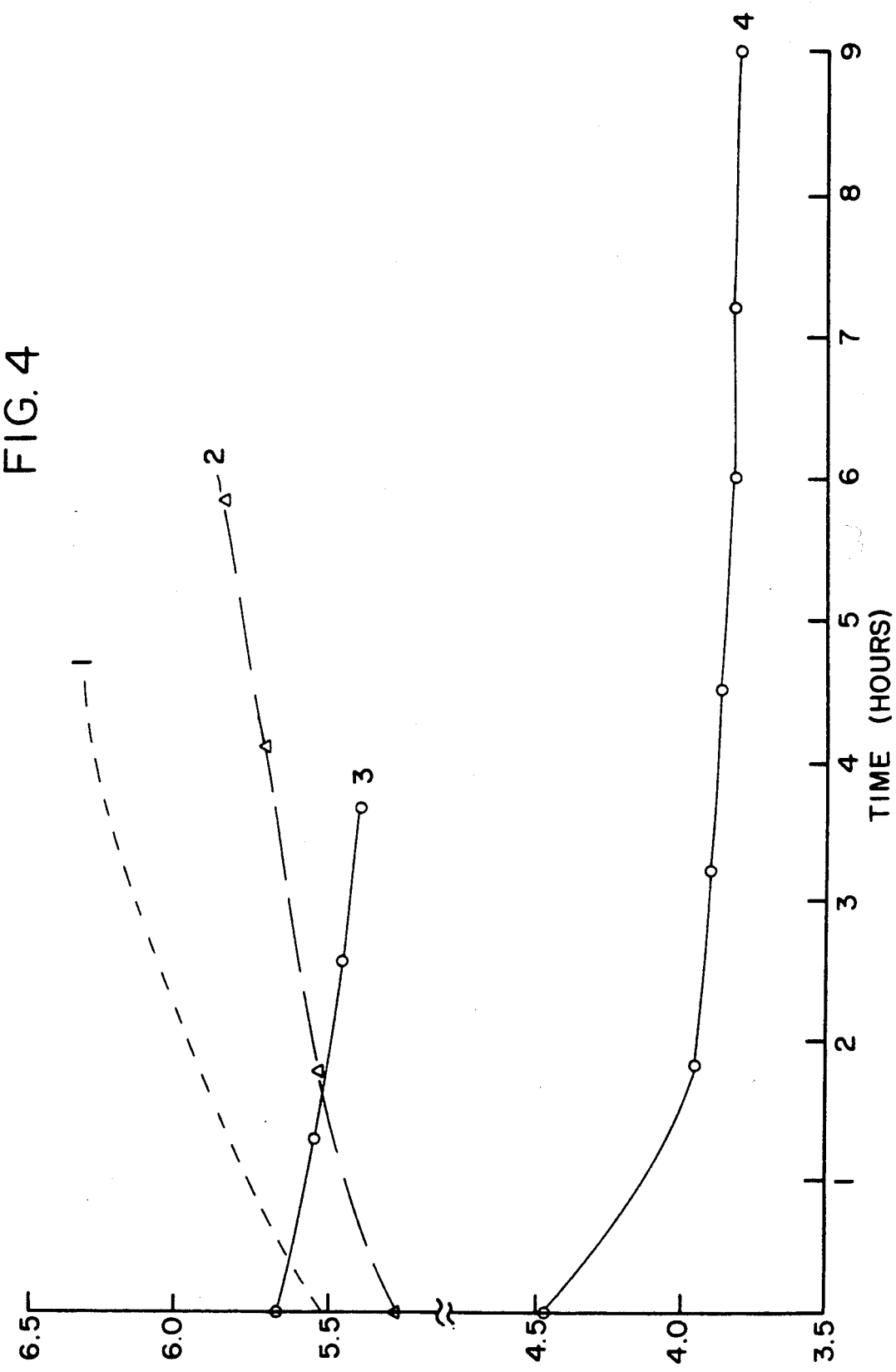

CATALYZED DIESEL EXHAUST PARTICULATE FILTER

CROSS-REFERENCE TO RELATED APPLICATIONS

This application is a continuation-in-part of copending application Ser. No. 07/415,431 filed Sept. 7, 1989 which is a continuation-in-part of application Ser. No. 07/250,459 filed Sept. 28, 1988 which is a continuation of application Ser. No. 07/122,625 filed Nov. 19, 1987 which is a continuation of application Ser. No. 06/602,783 filed Apr. 23, 1984, all of said related applications having been abandoned.

BACKGROUND OF THE INVENTION

1. Field of the Invention

This invention relates to diesel engine exhaust gas treatment and more particularly to the filtering of particulates from diesel engine exhaust gases using a catalyzed filter.

2. Background and Related Art

The question of how best to reduce the levels of particulate matter expelled to the atmosphere in the exhaust gases of diesel engines is currently of considerable interest. In this connection, it is desired to develop efficient and practical devices for removing substantial portions of particulates from the exhaust gases in diesel engine exhaust systems before permitting the exhaust gases to escape to the atmosphere.

It is known in the art to provide diesel engines with an exhaust filter which traps particulates from the exhaust gas stream during engine operation. The filters are generally made of porous, solid materials having a plurality of pores extending therethrough and having small cross-sectional size, such that the filter is permeable to the exhaust gases which flow through the filters and are capable of restraining most or all of the particulates from passing through the filter with the gas. The restrained particulates consist generally of carbonaceous particulates in the form of soot particles and reference herein and in the claims to "particulate" and "particulates" means such diesel engine-generated particles. As the mass of collected particulates increases, the flow rate of the exhaust gas through the filter is usually impeded, whereby an increased back pressure is encountered within the filter and reduced engine efficiency results. At this point, the filter is either discarded as a disposable/replaceable element or removed and regenerated by burning the collected particles off at temperatures in excess of 510° C. so that the filter can be reused.

There is a desire in the art to more simply regenerate the particulate filter by continuous burn-off or incineration of the soot particles as they are trapped in the filter. However, experience has shown that in normal diesel engine operation, the temperature in the exhaust system varies substantially under different conditions of engine load and speed and that the temperatures in the filter hardly ever reach the 510° C. temperature level required to incinerate the trapped particulate.

The art, as exemplified by U.S. Pat. No. 4,319,896, has attempted to rectify this situation by the use of a filter which embodies a catalytic material which raises the temperature of the hot exhaust gas stream. The art is not specific as to the catalytic materials, but teaches that, even at the raised exhaust temperatures effected by the use of these unspecified catalytic materials, these temperatures are still too low to effectively ignite the carbon particles retained in the filter. To effect burn-off of the particles in the filter, the filter must be periodically heated by electrical means to a temperature sufficiently high to burn off the retained soot. Even the use of an electrical burn-off device involves risk, for as noted in U.S. Pat. No. 4,319,896, care must be exercised during burn-off of the soot particles as the possibility exists that there will be too rapid a burning of the particulate and the filter may be heated to an excessively high temperature which can adversely damage the filter.

Federal Republic of Germany published Patent Application DE 3141713 (May, 1983) indicates that the use of a particulate filter which embodies a silver vanadate catalyst on a transition metal carrier such a aluminum oxide, silicon dioxide, titanium dioxide, zirconium dioxide and oxides of rare earth metals, lowers the temperature at which ignition of the trapped particulate is initiated.

SUMMARY OF THE INVENTION

Generally, the present invention effects burn-off, at or close to normal engine operating exhaust gas temperatures, of soot particles collected from a diesel engine exhaust on a particulate filter. Thus, the diesel exhaust particulate filter of the present invention provides means whereby the temperature at which soot particles may be incinerated can be lowered to a level more closely approximating the exhaust gas temperatures encountered in normal diesel engine operation than those attained with prior compositions. Consequently, burn-off and incineration of the soot particles trapped in the filter may be readily achieved and excessive particulate build-up in the filter avoided without risk of damage to the filter.

The filter device of the present invention is for use in the exhaust system of a diesel engine, and comprises a filter element containing a catalyst mixture of one or more platinum group metals and one or more alkaline earth metal oxides. The presence of the catalyst mixture in the filter lowers the temperature at which ignition and incineration of the particulates collected on the filter walls may be effected so that continuous self-cleaning or regeneration of the filter may be accomplished at diesel exhaust gas temperatures encountered under certain diesel engine operating conditions, whereby particulate plugging is avoided.

Specifically, in accordance with the present invention there is provided a catalyzed diesel exhaust particulate filter which comprises a high temperature resistant filter element, for example, a ceramic or foamed ceramic filter element, which may comprise a monolithic member, having porous walls. The filter is dimensioned and configured to filter particulates present in diesel engine exhaust gas flowed through the catalyzed filter, and to collect such particulates on the surfaces of the porous walls. The surfaces of the walls have thereon a catalyst consisting essentially of a mixture of at least one platinum group metal (for example, platinum or platinum plus rhodium) and at least one alkaline earth metal oxide (for example, magnesium oxide). This catalyst serves to lower the temperature at which the collected particulates are ignited and combustion thereof is initiated, whereby the particulates are continuously removed from the filter by burning.

In one aspect of the invention, the platinum and rhodium are present in a weight ratio of from about 1:1 to 10:1, preferably from about 3:1 to 5:1, Pt/Rh, calculated as the metal.

Another aspect of the present invention provides that the platinum group metal may be present on the surface of the filter at a concentration of about 5 to about 150 grams of platinum group metal, measured as the metal, per cubic foot of filter element. Either in conjunction with or independently of the foregoing, the present invention also provides that the alkaline earth metal oxide may be present on the surface of the filter at a concentration of about 30 to about 1500 grams of alkaline earth metal oxide, measured as the oxide, per cubic foot of filter element.

Other aspects of the present invention will be apparent from the foregoing description.

As used herein and in the claims, reference to a "ceramic" or "foamed ceramic" filter element means and includes conventional element of the type made from cordierite, mullite, alumina and/or other refractory metal oxides conventionally used for the purpose.

BRIEF DESCRIPTION OF THE DRAWINGS

FIG. 3 is a graph showing the variation in the backpressure of a catalyzed diesel exhaust particulate filter of the present invention when the temperature of the exhaust gas is varied over a 226°–392° C. temperature range.

FIG. 4 is a graph showing the variation of backpressure over time with small variations in exhaust temperature from 322°–362° C.

DETAILED DESCRIPTION OF THE INVENTION

Figure 1:
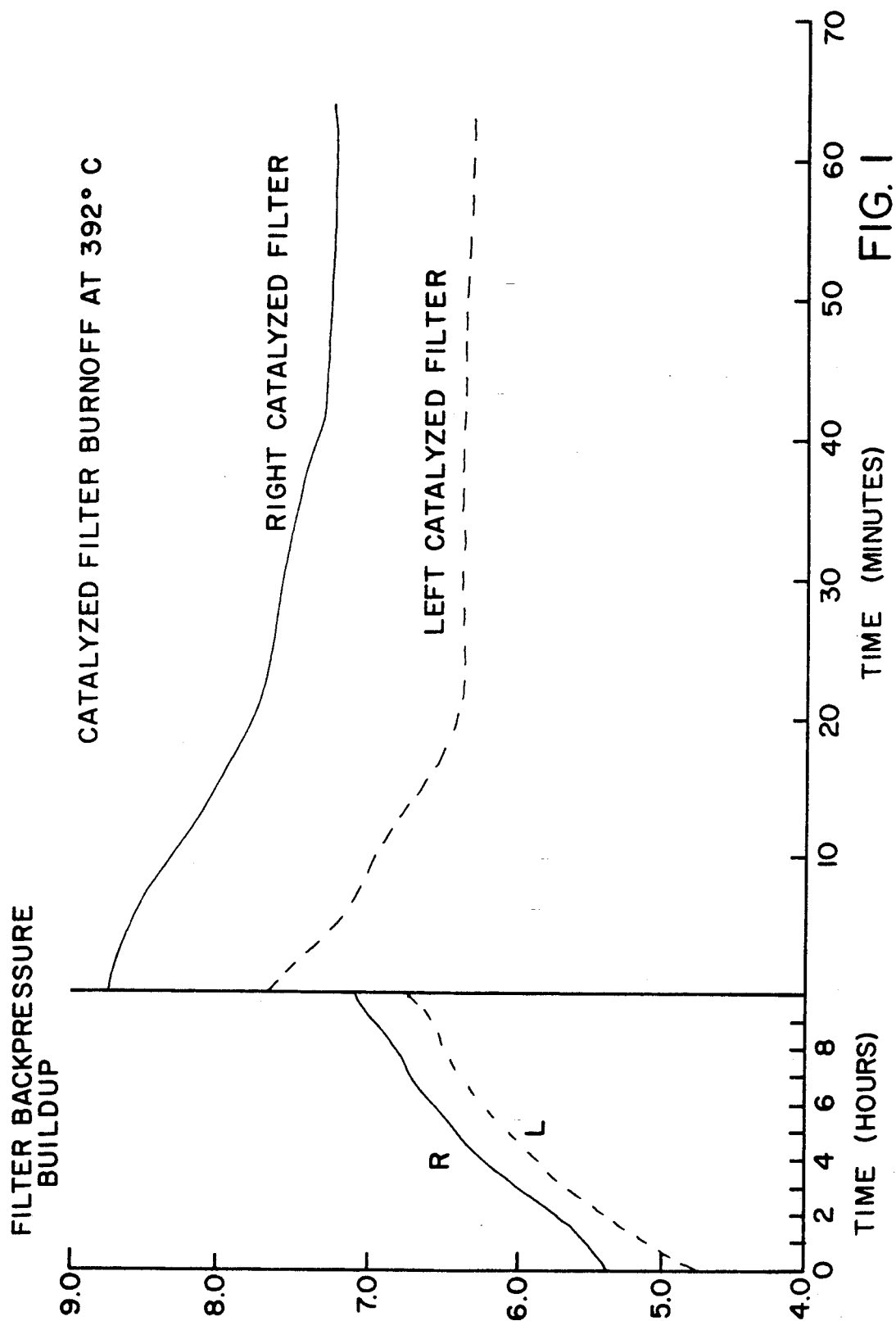
FIG. 1 is a graph showing the backpressure buildup in a catalyzed diesel exhaust particulate filter when the diesel engine exhaust gas temperature is 260° C. followed by the decrease in backpressure when the diesel engine operating conditions are changed so that the exhaust gas temperature is raised to 392° C. at which temperature burnoff of the collected particulate is effected.

In the practice of the present invention, the catalyzed filter is placed in the filter housing mounted in the exhaust gas handling system of a diesel engine which includes an exhaust manifold. The filter and filter housing are placed, along with any other gas line elements which may be present, between the exhaust gas manifold of the engine and the end of the exhaust tailpipe which is open to the atmosphere, but preferably as close as possible to the engine exhaust manifold to benefit from the higher temperature. Within the filter housing is placed the high efficiency, self-cleaning, catalyzed filter element of the present invention which is adapted to collect particulates in the exhaust gases delivered to the filter housing from the engine manifold. The filter element may be formed of any porous high temperature material which is configured to trap and hold substantial quantities of particulates from the diesel engine exhaust gases without creating an excessive restriction to exhaust gas flow and able to withstand the elevated temperatures encountered in exhaust gases during engine operation and regeneration.

Filter elements which are mounted in the filter housing for filtering diesel engine exhaust particulates include thin, porous-walled honeycomb (monolith) or foam structures through which the exhaust gases pass without causing too great an increase of backpressure or pressure drop across the filter housing. Normally the presence of a clean filter element will create a backpressure of 1.0 to 10.0 kilopascal (kpa), kilopascal being defined as 1000 newtons per meter squared, equivalent to 0.145 pounds per square inch, which does not materially affect the operating efficiency of the diesel engine. These filters are generally fabricated from ceramics, generally crystalline, glass ceramics, glasses, metals, cermets, resins or organic polymers, papers, textile fabrics (with or without fillers) and combinations thereof. A detailed description of the variety of prior art diesel engine exhaust particulate filters which may be catalyzed in accordance with the practice of the present invention is disclosed in U.S. Pat. No. 4,329,162, the disclosure of which is herein incorporated by reference.

In operation, exhaust gases emitted by the diesel engine are passed from the exhaust manifold through the exhaust pipe and the exhaust particulate filter housing wherein is mounted the catalyzed exhaust filter of the present invention. Within the filter, when the engine is cold or at low vehicle speeds, the exhaust gases pass through the porous walls where substantial portions of the particulates contained in the gases are collected on the catalyzed surfaces of the porous filter medium. At exhaust gas temperatures of about 375°–400° C., which temperatures are reached under certain loads in a typical diesel passenger automobile, the particulate collected on the walls of the filter are ignited and the collected particulate is continuously incinerated at these exhaust temperatures. The cleaned exhaust gas then passes out of the filter to the remaining portions of the exhaust system from which it escapes to the atmosphere.

The catalyst of the present invention is characterized by a mixture of a platinum group metal such as platinum, palladium, rhodium and ruthenium and an alkaline earth metal oxide such as magnesium oxide, calcium oxide, strontium oxide or barium oxide with an atomic ratio between the platinum group metal and the alkaline earth metal of about 1:250 to about 1:1 and preferably about 1:60 to about 1:6.

Platinum is a preferred platinum group metal and magnesium oxide is preferred as the alkaline earth metal oxide component of the catalyst mixture of the present invention.

A preferred combination for attaining a reduction in sulfate emissions is platinum plus rhodium as the platinum group metal, preferably in a weight ratio of Pt to Rh (as the metal) of about 1:1 to 10:1, more preferably of about 5:1, plus one or more alkaline earth metal oxides, preferably magnesium oxide.

In preparing the catalyzed particulate filters of the present invention, the catalyst may be present in the form of a coating or film layer consisting of one or more platinum group metals and one or more alkaline earth metal oxides. This coating or film may be present in a coating weight or concentration of from about 32 to about 1700 grams per cubic foot ($g/ft^3$), preferably from about 55 to about 1,050 $g/ft^3$, of filter volume, with the platinum group metal or metals comprising about 2 to about 200 $g/ft^3$, preferably from about 5 to about 150 g/ft³, and the alkaline earth metal oxide or oxides comprising from about 30 to about 1500 g/ft³, preferably about 50 to about 900 g/ft³.

Depositing the catalyst mixture of the present invention on the porous walls of a filter element such as a monolithic ceramic material or a foam ceramic material can be carried out in any conventional manner. A preferred method of depositing the catalyst mixture on the surfaces of the filter element walls is to impregnate the filter element with an aqueous solution of a salt of the platinum group metal as well as an aqueous solution of a water soluble alkaline earth metal salt. This is best accomplished by bringing the filter element into contact with an aqueous solution of either the platinum group metal salt or alkaline earth metal salt or both by dipping the filter element in the solution or solutions, removing excess solution by draining and subsequent drying at 110° to 50° C. followed by calcining at 450° to 600° C.

The present invention is illustrated by the following examples:

EXAMPLE I

A series of Corning diesel particulate filter elements of 1.5 inch diameter and 3.0 inch length (5.3 in³ volume) having a ceramic cordierite monolith structure of 10 to 40 m pore size range, 200 cell/in² cell density and a 12 mil wall thickness was selected for catalyst treatment in the following manner:

Eighty grams of $Mg(NO_3)_2 \cdot 6H_2O$ were dissolved in 250 cc deionized water and the filter element immersed in the solution for 2 minutes. Following the removal of the filter element from the $Mg(NO_3)_2$ solution, excess solution was drained from the filter element and the filter element dried at 110° C. for 2 hours. The dried filter element was calcined at 500° C. for 15 minutes. After cooling to room temperature, the filter element was immersed in an aqueous solution containing 10 grams of platinum as $H_2Pt(OH)_6$ solubilized in an amine. The filter was removed from the platinum salt solution, drained of excess solution, dried at 110° C. for 2 hours and then calcined at 550° C. for 15 minutes. The cooled filter element was determined to contain 130g/ft³ platinum and 196 g/ft³ MgO. The so catalyzed filter element was placed in a filter housing after weighing and exposed to the exhaust stream of a Daimler-Benz diesel engine. The filter elements were weighed and then placed in muffle furnaces heated to different temperatures, e.g. 400° C., 500° C., and 600° C. for 1 hour at each temperature. The weight loss in the filter element was then determined. These data are recorded in Table I as the weight loss which occurred at each specific temperature.

The procedure of Example I was repeated with the exception that a Toyomenka foam cordierite ceramic particulate filter element of 1.5 inch diameter and 2.0 inch length (3.5 in³ volume) of 20 cells/25 mm cell density/wall thickness was substituted for the ceramic monolith filter element. The catalyzed foam filter element was determined to contain 130 g/ft³ platinum and 881 g/ft³ MgO. The weight loss data for the catalyzed foam ceramic filter element is also recorded in Table I below.

For the purposes of comparison, the procedure of Example I was repeated with the exception that weight loss data was obtained for a ceramic monolith filter element which had not been catalyzed, designated by the symbol "$C_1$" and a ceramic monolith filter which had been catalyzed with a combination of platinum and palladium (designated by the symbol "$C_2$") the amount of catalyst present on the filter being about 130 g/ft³, the Pt/Pd ratio being 10/1. The weight loss data for filters $C_1$ and $C_2$ ar also recorded in Table I below.

TABLE I

| Filter Element | Type | Weight Loss (Grams) After Heating At | | | |
|---|---|---|---|---|---|
| | | 400° C. | 500° C. | 600° C. | Total Loss |
| 1 | Ceramic Monolith | 0.5 | 0 | 0.2 | 0.7 |
| 2 | Ceramic Foam | 0.7 | 0.2 | 0.3 | 1.2 |
| $C_1$ | Ceramic Monolith | 0.2 | 0 | 0.1 | 0.3 |
| $C_2$ | Ceramic Monolith | 0.1 | 0.1 | 0.4 | 0.6 |

By reference to Table I, it is immediately apparent that the catalyzed filter elements 1 and 2 had lost considerably more weight (greater burn-off of particulate) than the uncatalyzed filter element ($C_1$) or the filter element catalyzed only with platinum group metal ($C_2$).

EXAMPLE II

Catalyzed ceramic monolith filter elements prepared in accordance with Example I were placed in filter housings mounted on the right and left exhaust pipes of a Deutz F8L-413 8 cylinder diesel engine, through which the exhaust gases from the engine manifold were required to pass. The engine was operated with a dynamometer. Experience had shown that in normal engine operation, the temperature in the exhaust system varies substantially under different conditions of engine load and speed. Using the above test arrangement, it had been determined that when using an uncatalyzed ceramic monolith filter element, it was necessary to heat the filter element to a temperature of at least 510° C. to regenerate a plugged filter.

To test the effectiveness of the catalyzed filter element, the dynamometer was operated at an engine speed of 2200 rpm and a load of 183 Newton meters (N.m.) torque which could be associated with a vehicle road speed of about 50 mph for a typical heavy duty diesel vehicle on a horizontally level road surface. The filter housings in which the catalyzed filter elements were placed were located about one meter downstream from the exhaust manifold. The exhaust gas temperature was 260° C.

Backpressure caused by (or pressure drop across) the filter elements was measured over an eight hour period wherein the backpressure increased at the rate of 0.178 kPa/hour in the right catalyzed filter and 0.211 kPa/hour for the left catalyzed filter due to the buildup and accumulation of particulate in the filter elements. After the backpressure in the filter elements rose to about 8-9 kPa, the torque was raised to 406 N.m. The increased load caused the exhaust gas temperature to be raised 392° C. At this exhaust gas temperature, the backpressure dropped to a lower steady state level within 20-40 minutes indicating that burn-off of particulate collected in the filter had occurred. The backpressure in the right filter element when it was clean, i.e., substantially free of particulate, was determined to be 6.1 kPa at an engine speed of 2200 rpm and a torque of 183 N.m. (260 C exhaust gas temperature) and the backpressure of the clean left filter under these same conditions was about 5.3 kPa.

Figure 2:
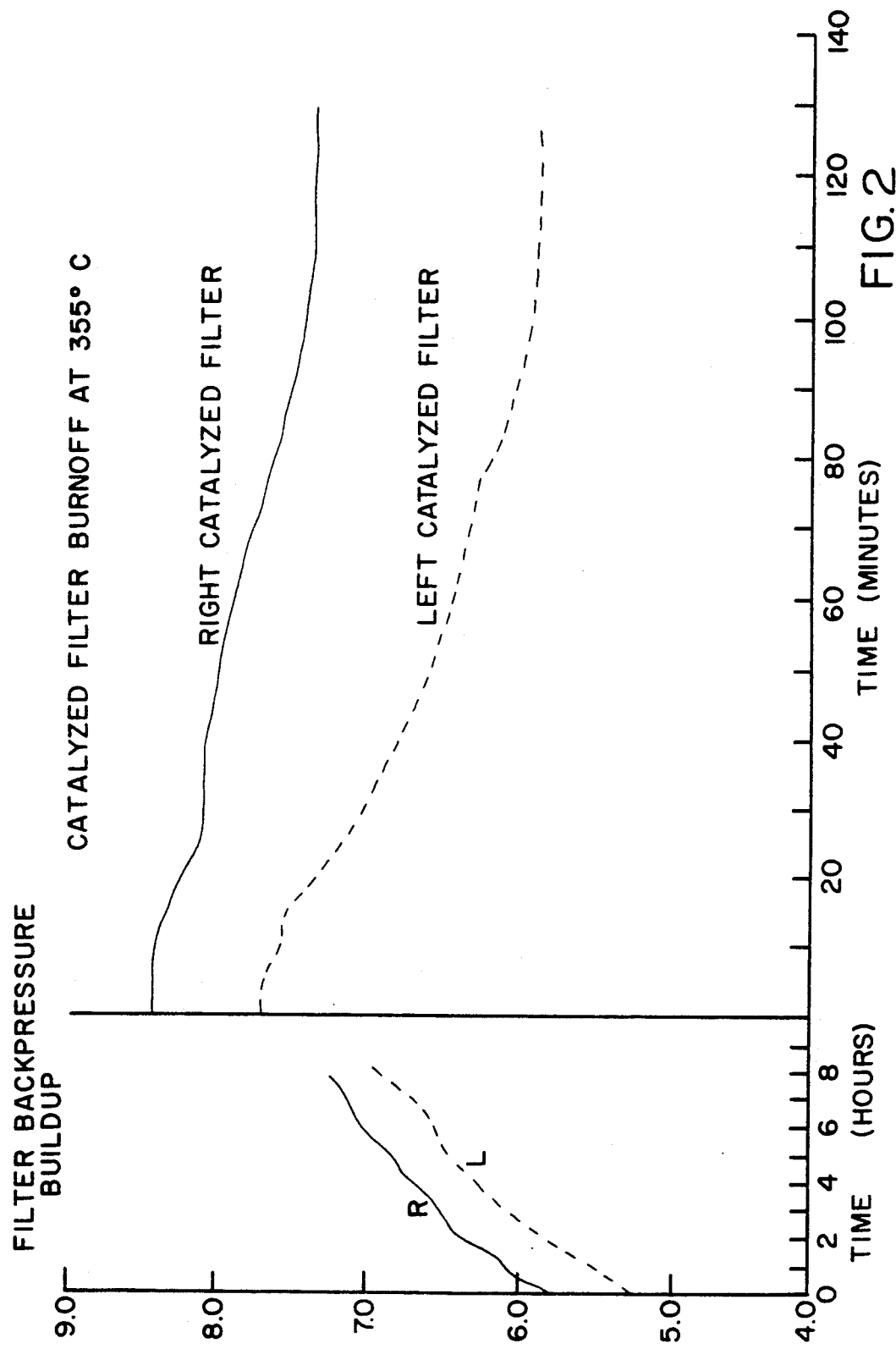
FIG. 2 is a graph showing the backpressure buildup over time in a catalyzed diesel exhaust particulate filter when the exhaust temperature is 260° C. followed by a decrease in backpressure over time when the diesel engine operating conditions are changed so that the exhaust gas temperature is raised to 355° C. at which temperature burnoff of collected particulate is effected.

FIGS. 1-3 show a graph wherein the time of exhaust gas flow through the right and left catalyzed filters is plotted on the horizontal axis and backpressure buildup in the catalyzed filters due to particulate accumulation is plotted on the vertical axis. The curves are plotted from actual data.

FIG. 1 illustrates graphically that at an exhaust gas temperature of 260° C., there is a continual buildup of backpressure in the catalyzed filters indicating the accumulation of particulate in the filters after 8 hours. When the load on the engine is increased to raise the temperature to 392° C., the backpressure in both the right and left filter elements declines rapidly, i.e., within 20-40 minutes, indicating a burn-off of particulate at a temperature substantially below the normal ignition and incineration temperature (550° C.) of the particulate. The data plotted in FIG. 1 clearly demonstrates that the presence of the catalyst in the filter element lowers the temperature at which regeneration of the filter can be accomplished, the steady state backpressure being fairly close to the backpressures existing in the clean filters. For example, an examination of the curves in FIG. 1 indicates that the steady state backpressure of the right filter after 40 minutes exposure to exhaust gas heated to 392° C. is about 7.5 kPa as compared to 6.3 kpa for the clean filter, and the steady state backpressure for the left filter after 20 minutes exposure to the 392° C. exhaust gas 6.5 kPa after 20 minutes exposure as compared to 5.3 kPa for the clean filter.

EXAMPLE III

The procedure of Example II was repeated with the exception that for the burn-off cycle, the engine speed was 2240 rpm and the torque was 325 N.m. which conditions created an exhaust temperature of 355° C. At this exhaust temperature burn-off to a steady state backpressure required approximately 105 minutes for both the right and left catalyzed filters as indicated by the curves plotted in FIG. 2. The buildup of backpressure for the right catalyzed filter was at 0.200 kPa/hour and 0.243 kPa/hour for the left catalyzed filter. The curves in FIG. 2 indicate that at an exhaust temperature of 355° C., (i.e., 155° C. less than the minimum ignition temperature of the particulate with an uncatalyzed filter), substantial burn-off of particulate accumulated in the catalyzed filter is possible within a reasonable period of time, at relatively low exhaust gas temperatures.

The procedure whereby the regeneration (burn-off) temperature was determined is illustrated in FIG. 3. The engine exhaust temperature was raised incrementally from 226° C. to 392° C. at a constant engine speed of 2200 rpm. At each increasing exhaust temperature increment, the backpressure was observed to increase until a temperature of 392° C. was reached, whereupon the back pressure decreased. (The decrease in backpressure started a 373° C. for the left catalyzed filter). This continuing decrease in backpressure indicated burnoff of the particulate in the filters.

EXAMPLE IV

The effect of catalyzing the filter on filter regeneration was further examined by running a simulated work duty cycle of a diesel mine vehicle on the Deutz F8L-413 engine of the type used in Example II, while operating on a computer controlled engine dynamometer. The work cycle used was originally defined in a study at Michigan Technological University and is referred to as the MTU cycle. Previous tests using the Deutz engine and non-catalyzed filters in the MTU cycle indicated that there was no burn-off regeneration of the filter at normal engine exhaust temperature levels, namely about 340° C. This result was consistent with prior studies that a minimum temperature of 510° C. was necessary to initiate regeneration of non-catalyzed filters.

In the present Example, the MTU cycle was operated at several engine exhaust temperatures extending over a narrow range of 322° C.-362° C. to simulate the effect of a series of actual engine operating conditions on the catalyzed filter so as to more precisely identify the temperature at which burn-off regeneration would occur with the catalyzed particulate filter of the present invention.

To vary the exhaust temperatures in the test, the temperature of the intake air to the engines was varied to achieve the desired range of exhaust temperatures. The increase in combustion air temperature caused a corresponding increase in the exhaust gas temperature. The varying exhaust temperatures designated as Tests 1-4 are recorded in Table II below. A catalyzed filter loaded with particulate was placed in the filter housing mounted downstream of both right and left exhaust manifolds of the test diesel engine. The MTU cycle, which has a duration of 2.5 minutes was run repeatedly without interruption over a time period of 3.5 to 9.5 hours as in FIG. 4. The curves of engine backpressure represent the average value of the right and left engine back pressure.

TABLE II

| Test No. | Exhaust Temp. °C. | Buildup rate kPa/hour |
|---|---|---|
| 1 | 322 | 0.181 |
| 2 | 338 | 0.103 |
| 3 | 354 | — |
| 4 | 354 | — |

The curves plotted in FIG. 4, show the change in backpressure experienced over a 3.5 to 9.5 hour period at each of the exhaust temperatures listed in Table II.

As is apparent from an examination of FIG. 4, the backpressures indicated at the lower exhaust gas temperatures, i.e., test numbers 1 and 2 continued to rise over the test period, indicating gradual plugging of the catalyzed filter with particulate, whereas at the higher exhaust gas temperatures (354° C.), test numbers 3-4, the backpressure declined indicating that at temperatures of at least 156° C. below the normal ignition temperature of the particulate, burn-off of particulate was possible with the catalyzed filter.

The gaseous emissions from the diesel engine exhaust pipe expelled into the atmosphere over the MTU cycle with the catalyzed filter operated at an exhaust gas temperature of 354° C. are recorded in Table III below. The gaseous emissions from an exhaust pipe not equipped with a particulate filter are also recorded in Table III under the designation "No Filter".

TABLE III

| | CO ppm | THC* ppm | NO ppm | $NO_x$ ppm | $NO_2$ ppm |
|---|---|---|---|---|---|
| Catalyzed Filter | 5 | 41 | 326 | 403 | 77 |
| No Filter | 113 | 84 | 417 | 460 | 43 |

*Total hydrocarbons

The data recorded in Table III indicate that the presence of the catalyzed particulate filter in the exhaust system of a diesel engine has a generally positive effect on reducing the gaseous emissions of the system.

As indicated by the above Examples, embodiments of the catalyzed particulate filter of the present invention which contain only platinum as the platinum group metal are effective in promoting burn-off of the particulates filtered from the diesel exhaust at significantly lower temperatures than obtainable with uncatalyzed filters. The following examples show that a further advantage of reducing the amount of sulfur dioxide oxidation promoted by the catalyzed filter is attainable by employing a combination of platinum plus rhodium as the platinum group catalytic metal.

EXAMPLE V

A series of monolith bodies having a ceramic cordierite structure of 5 micron pore size range, 400 cells per square inch cell density, an eight mil wall thickness and a volume of 55 cubic inches ("in$^3$) were catalyzed in the following manner. For this test of SO$_2$ oxidation and gaseous oxidation activity ordinary flow-through ceramic monolith supports were used, instead of closed-end filters, in order to simplify the test procedure. That is, the cells (gas flow passages extend through the monolith and are open at both ends.

The catalyzed supports were prepared as follows: 230 grams of Mg(NO$_3$)$_2$.6H$_2$O were dissolved in 1000 cc of deionized water and the filter element was immersed in the solution for 1 minute. Following the removal of the filter element from the magnesium nitrate solution, excess solution was drained from the filter element and the filter element dried at 125° C. for 3 hours. The dried filter elements were calcined at 500° C. for 60 minutes. The resulting 55 in$^3$ units contained 95 g/ft$^3$ of MgO and were core drilled after cooling to provide cores measuring 1.5 inches in diameter and 3 inches in length. These one elements of 5.3 in$^3$ volume comprised the precious metal catalyzed monolith test samples.

A standard Pt-only catalyst containing a nominal 50 g/ft$^3$ of Pt was prepared by immersing the MgO-coated monolith element into an aqueous solution containing 0.150 grams of platinum as H$_2$Pt(OH)$_6$ solubilized in monoethanolamine (MEA). A standard Pt/Rh catalyst was prepared by immersing the MgO coated substrates into a combined aqueous solution containing 0.125 grams of platinum from the platinum solution described above and 0.025 grams of rhodium as Rh(NO$_3$)$_3$. The immersed element was removed from the platinum and rhodium salt solution, drained of excess solution, dried at 125° C. for 3 hours and then calcined at 500° C. for 60 minutes. The cooled monolith element contained a nominal 41.7 g/ft$^3$ of platinum and 8.3 g/ft$^3$ of rhodium for a total of 50 g/ft$^3$ of precious metal and 95 g/ft$^3$ of MgO. These standard platinum and platinum-rhodium samples are identified by the notation "Std." in Tables IV and V below.

Because the above-described platinum solution will form a precipitate when the pH shifts to more acidic conditions, and the Rh(NO$_3$)$_3$ solution is acidic, a modification of the solution was made to accommodate the addition of the acidic Rh(NO$_3$)$_3$ solution. Thus, if the above platinum solution is heated to 90° C. for a period of time, it will no longer form a precipitate when the acidic Rh(NO$_3$)$_3$ solution is added. The remaining catalyst samples (those which do not bear the notation "Std." in Tables IV and V below) were prepared with this modified solution in a manner otherwise identical to that described for preparing the standard monolith samples. The catalyzed ceramic monolith samples were prepared as described above to have different proportions of platinum to rhodium by varying the concentration of H$_2$Pt(OH)$_6$ and Rh(NO$_3$)$_3$ in the impregnating solution. This included the preparation of supports with no rhodium, attained by omitting Rh(NO$_3$)$_3$ from the impregnating solution but using the previously heated platinum solution.

The SO$_2$ oxidation activity of the catalyzed ceramic support samples were tested by passing 300 ppm of SO$_2$ in air over the catalyst core in a heated reactor at 400° C. with a gas flow of 1.0 SCFM and a pressure of 5.5 psig. Inlet and exit SO$_2$ contents were measured after 1 hour to determine the percentage of initial SO$_2$ content converted to SO$_3$. The one hour saturation period had previously been determined to be sufficient for a sample of this size and composition. The catalyst samples were evaluated as prepared (without aging) so as to measure their highest SO$_2$ oxidation capabilities, inasmuch as sintering of the precious metals lowers activity for SO$_2$, HC and CO oxidation.

The results of the oxidation test are set out in the following Table IV, in which the percentage conversion of the SO$_2$ content of the test gas to SO$_3$ is given for the otherwise identical catalyzed supports having different ratios of platinum to rhodium.

TABLE IV

| Pt to Rh Weight Ratio | Percentage of Initial SO$_2$ Content Converted to SO$_3$ |
|---|---|
| 100% Pt-Std | 51% |
| 5 Pt:1 Rh-Std | 13% |
| 100% Pt | 41% |
| 10 Pt:1 Rh | 33% |
| 5 Pt:1 Rh | 13% |
| 3 Pt:1 Rh | 6% |
| 1 Pt:1 Rh | 7% |

The data of Table IV shows that the combination of platinum and rhodium as the platinum group metal provides a substantial reduction in the amount of SO$_2$ which is oxidized to SO$_3$ as compared to an otherwise identical composition in which the platinum group metal is platinum alone. The "standard" and modified technique 5:1 Pt to Rh samples performed identically. When the weight ratio of Pt to Rh is reduced to 5 to 1 or less, it is seen that the amount of SO$_2$ oxidation is significantly reduced, to about one-third that of the 100% platinum version, and less than about one-half of that attained by the 10 to 1 Pt to Rh version. Thus, while a 10 to 1 Pt to Rh version gives some improvement relative to SO$_2$ oxidation, a 5 to 1 or lower ratio is preferred as giving significant improvement in SO$_2$ oxidation. The lower limit on the Pt to Rh ratio in a given case appears to be set by economic considerations, rhodium being considerably more expensive than platinum.

EXAMPLE VI

The catalyzed monoliths of Example V, after being tested for SO$_2$ oxidation as therein described, were aged in air for a twenty-four hour period at 500° C. (932° F.). The aged samples were then evaluated for oxidation activity characteristics in a test procedure as follows, in which the SO$_2$ oxidation activity characteristics were evaluated in a light-off test.

The gas flow over the cores was set to give a space velocity of 50,000 VHSV. (volumes of gas per hour, measured at standard pressure and temperature, per volume of catalyst). The gas composition was, in volume percent, 1.0% CO, 0.33% H$_2$, 10.% CO$_2$, 1.35%

$O_2$, 0.04% $C_3H_6$, 0.01% $C_3H_8$, 0.10% NO, 10.0% $H_2O$, and the balance $N_2$. Although this composition contains less oxygen than usual diesel engine exhaust gases, it was selected because of its ability to differentiate between samples under oxidizing conditions. Further, it is believed that during soot burn-off, the localized environment near the precious metal sites would not be as lean (oxygen-rich) as is usual under ordinary diesel operating conditions. Therefore the test conditions are believed to be predictive of the actual diesel engine exhaust treatment conditions sustained by the catalyst.

The following Table V gives the temperatures at which 50 percent and 90 percent, respectively, of the initial content of carbon monoxide ("CO") and hydrocarbons ("HC") of the exhaust gas was oxidized to carbon dioxide (the CO) and to carbon dioxide and $H_2O$ (the HC) in the light-off test. The temperatures attained are referred to as "light-off" temperatures: $T_{90}$ is used to designate the temperature at which ninety percent of the initial CO or HC content, respectively, is oxidized, and $T_{50}$ is used to designate the temperature at which fifty percent of the initial CO or HC content, respectively, is oxidized.

TABLE V

| Pt to Rh Weight Ratio | Light-Off Temperature, °C. | | | |
|---|---|---|---|---|
| | $T_{50}$ CO | $T_{90}$ CO | $T_{50}$ HC | $T_{90}$ HC |
| 100% Pt-Std | 286 | 322 | 303 | 342 |
| 5 Pt:1 Rh-Std | 242 | 266 | 252 | 320 |
| 100% Pt | 295 | 331 | 315 | 352 |
| 10 Pt:1 Rh | 271 | 280 | 280 | 342 |
| 5 Pt:1 Rh | 239 | 258 | 248 | 292 |
| 3 Pt:1 Rh | 238 | 254 | 244 | 302 |
| 1 Pt:1 Rh | 252 | 273 | 260 | — |

The data of Table V show that use of the different platinum salts in making the catalyzed substrates has very little effect on the light-off performance. The "Pt-Std" catalysts perform in a manner comparable to the other catalysts of equivalent Pt:Rh ratio, in that the light-off temperatures are within about 10° C. of each other for both CO and HC. As the proportion of rhodium is increased relative to that of platinum, the light-off temperature drops, most notably for CO and $T_{50}$ HC. As the relative amount of Rh is increased to 5:1 or 3:1 Pt to Rh, the $T_{90}$ HC is lowered, indicating that saturated hydrocarbons are lighting-off at a lower temperature. Going from 10:1 to 5:1 Pt to Rh shows a benefit while increasing Rh loading from 3:1 to 1:1 Pt to Rh shows a slight increase in light-off but $T_{90}$ HC has deteriorated, i.e., increased. The 1:1 Pt to Rh catalyst achieves 75% conversion of unsaturated hydrocarbons but it apparently can no longer oxidize the saturated HC.

The tests used to generate the data of Table V were repeated, re-using the same catalyzed substrate samples that were used in the Table V tests. Typically, the second run of such catalysts will show improved (lower) light-off temperatures and efficiency. As the data of Table VI below shows, only the 100% Pt samples showed improvement, but the Pt plus Rh samples were still significantly better with respect to light-off temperatures than the platinum-only catalysts samples.

TABLE VI

| Pt to Rh Weight Ratio | Light-Off Temperature, °C. | | | |
|---|---|---|---|---|
| | $T_{50}$ CO | $T_{90}$ CO | $T_{50}$ HC | $T_{90}$ HC |
| 100% Pt-Std | 254 | 279 | 279 | 308 |
| 5 Pt:1 Rh-Std | 248 | 265 | 256 | 310 |

TABLE VI-continued

| Pt to Rh Weight Ratio | Light-Off Temperature, °C. | | | |
|---|---|---|---|---|
| | $T_{50}$ CO | $T_{90}$ CO | $T_{50}$ HC | $T_{90}$ HC |
| 100% Pt | 275 | 315 | 309 | 334 |
| 10 Pt:1 Rh | 259 | 274 | 269 | 301 |
| 5 Pt:1 Rh | 249 | 263 | 256 | 284 |
| 3 Pt:1 Rh | 248 | 261 | 256 | 310 |
| 1 Pt:1 Rh | 272 | 290 | 290 | — |

While specific embodiments of the present invention are described in detail herein, they are illustrative in nature and the scope of the present invention is defined in the appended claims. Modifications to the illustrated embodiments will occur to those skilled in the art upon a reading of the within disclosure. Such modifications are also intended to be included within the scope of the appended claims.

We claim:

1. A catalyzed diesel exhaust particulate filter comprises a high temperature resistant filter element having porous walls and being dimensioned and configured to filter particulates present in diesel engine exhaust gas flowed through the catalyzed filter and collect such particulates on the surfaces of the porous walls, the surfaces of the walls having thereon a catalyst consisting essentially of a mixture of at least one platinum group metal and at least one alkaline earth metal oxide, which catalyst lowers the temperature at which the collected particulates are ignited and combustion thereof is initiated, whereby the particulates are continuously removed from the filter by burning.

2. The catalyzed filter of claim 1 wherein the platinum group metal comprises platinum.

3. The catalyzed filter of claim 1 wherein the platinum group metal comprises platinum plus rhodium.

4. The catalyzed filter of claim 3 wherein the platinum and rhodium are present in a weight ratio of from about 1:1 to 10:1 Pt/Rh, calculated as the metal.

5. The catalyzed filter of claim 3 wherein the platinum and rhodium are present in a weight ratio of from about 3:1 to 5:1 Pt/Rh, calculated as the metal.

6. The catalyzed filter of any one of claims 1, 2, 3 or 6 wherein the platinum group metal is present on the surface of the filter at a concentration of about 5 to about 150 grams of platinum group metal, measured as the metal, per cubic foot of filter element.

7. The catalyzed filter of any one of claims 1, 2, 3 or 5 wherein the platinum group metal is present on the rial.

8. The catalyzed filter of claim 7 wherein the filter element comprises a foamed ceramic material.

9. The catalyzed filter of claim 1 wherein the alkaline earth metal oxide comprises magnesium oxide.

10. The catalyzed filter of claim 1 or claim 9 wherein the alkaline earth metal oxide is present on the surface of the filter at a concentration of about 30 to about 1500 grams of alkaline earth metal oxide, measured as the oxide, per cubic foot of filter element.

11. The catalyzed filter of claim 1 wherein the atomic ratio of the platinum group metal content to the alkaline earth metal content in the catalyst mixture is about 1:60 to about 1:6.

12. The catalyzed filter of claim 11 wherein the platinum group metal comprises one or both of platinum and rhodium and the alkaline earth metal oxide comprises magnesium oxide.

13. A catalyzed diesel exhaust particulate filter comprises a high temperature resistant, ceramic filter element having porous walls and being dimensioned and configured to filter particulates present in diesel engine exhaust gas flowed through the catalyzed filter and collect such particulates on the surfaces of the porous walls, the surfaces of the walls having thereon a catalyst consisting essentially of (i) a platinum group metal selected from the group consisting of one or both of platinum and rhodium, and (ii) at least one alkaline earth metal oxide essentially including magnesium oxide, which catalyst lowers the temperature at which the collected particulates are ignited and combustion thereof is initiated, whereby the particulates are continuously removed from the filter by burning.

14. The catalyzed filter of claim 13 wherein the platinum group metal is present on the surface of the filter at a concentration of about 5 to about 150 grams of platinum group metal, measured as the metal, per cubic foot of filter element, and the alkaline earth metal oxide is present on the surface of the filter at a concentration of about 30 to about 1500 grams of alkaline earth metal oxide, measured as the oxide, per cubic foot of filter element.

15. A method of removing deposits from the exhaust gas of a diesel engine comprises passing the exhaust gas through a catalyzed diesel exhaust particulate filter comprising a high temperature resistant filter element having porous walls and being dimensioned and configured to filter the particulates present in diesel engine exhaust gas flowed through the catalyzed filter and collect such particulates on the surfaces of the porous walls, the surfaces of the walls having thereon a catalyst consisting essentially of a mixture of at least one platinum group metal and at least one alkaline earth metal oxide, which catalyst lowers the temperature at which the collected particulates are ignited and combustion thereof is initiated, whereby the particulates are continuously removed from the filter by burning.

16. The method of claim 15 wherein the platinum group metal of the catalyst comprises platinum.

17. The method of claim 15 wherein the platinum group metal of the catalyst comprises platinum plus rhodium.

18. The method of claim 17 wherein the platinum and rhodium are present in a weight ratio of from about 3:1 to 5:1 Pt/Rh, calculated as the metal.

19. The method of any one of claims 15, 16, 17 or 18 wherein the alkaline earth metal oxide comprises magnesium oxide.

20. The method of any one of claims 15, 16, 17 or 18 wherein the platinum group metal is present on the surface of the filter at a concentration of about 5 to about 150 grams of platinum group metal, measured as the metal, per cubic foot of filter element.

21. The method of any one of claims 15, 16, 17 or 18 wherein the alkaline earth metal oxide is present on the surface of the filter at a concentration of about 30 to about 1500 grams of alkaline earth metal oxide, measured as the oxide, per cubic foot of filter element and the atomic ratio of the platinum group metal content to the alkaline earth metal content in the catalyst mixture is about 1:60 to about 1:6.

* * * * *